United States Patent
McGrew et al.

(10) Patent No.: US 6,862,354 B1
(45) Date of Patent: Mar. 1, 2005

(54) STREAM CIPHER ENCRYPTION METHOD AND APPARATUS THAT CAN EFFICIENTLY SEEK TO ARBITRARY LOCATIONS IN A KEY STREAM

(75) Inventors: David A. McGrew, Los Gatos, CA (US); Scott R. Fluhrer, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 824 days.

(21) Appl. No.: 09/675,570

(22) Filed: Sep. 29, 2000

(51) Int. Cl.$^7$ .................................................. H04L 9/00
(52) U.S. Cl. ............................. 380/42; 380/37; 380/43; 380/44; 380/45; 380/46; 380/47
(58) Field of Search .............................. 380/37, 42–47; 708/252

(56) References Cited

U.S. PATENT DOCUMENTS

| | | | |
|---|---|---|---|
| 4,944,009 A | * 7/1990 | Micali et al. | 380/46 |
| 5,454,039 A | 9/1995 | Coppersmith et al. | 380/28 |
| 5,675,652 A | 10/1997 | Coppersmith et al. | 380/28 |
| 5,835,597 A | 11/1998 | Coppersmith et al. | 380/28 |
| 6,490,354 B2 | * 12/2002 | Venkatesan et al. | 380/43 |

OTHER PUBLICATIONS

O. Goldreich et al., "How to Construct Random Functions," Journal of the Association for Computing Machinery, 53:4 (Oct., 1986), pp. 792–807.

B. Schneier, "Applied Cryptography: Protocols, Algorithms and Source Code in C," 2$^{nd}$ ed. (New York: John Wiley & Sons, 1996), pp. 400–402.

Rogaway, P. and Coppersmith, D., "A Software–Optimized Encryption Algorithm", Proc. of 1994 Fast Software Encryption Workshop, Lecture Notes In Computer Science, vol. 809, Springer–Verlag, 1994, pp. 56–63, *reprinted in* J. Cryptology 11:4, Springer–Verlag, 1998, pp. 273–287, *and* http://www.cs.ucdavis.edu/~rogaway/papers/seal–abstract.html.

M. Bellare et al., "Forward Integrity for Secure Audit Logs," Dept. Comp. Sci. Eng., Univ. Calif. at San Diego, Nov. 23, 1997.

B. Schneier et al., "Cryptographic Support for Secure Logs on Untrusted Machines," Proc. Seventh USENIX Security Symposium,, USENIX Press, Jan. 1998, pp. 53–62.

S. Kent et al., "Security Architecture for the Internet Protocol," IETF Request for Comments (RFC) 2401, The Internet Society, Nov. 1998.

S. Kent et al., "IP Authentication Header," IETF Request for Comments (RFC) 2402, The Internet Society, Nov. 1998.

S. Kent et al., "IP Encapsulating Security Payload (ESP)," IETF Request for Comments (RFC) 2406, The Internet Society, Nov. 1998.

D. Harkins et al., "The Internet Key Exchange (IKE)," RFC 2409, The Internet Society, Nov. 1998.

H. Orman, "The OAKLEY Key Determination Protocol," RFC 2412, The Internet Society, Nov. 1998.

* cited by examiner

*Primary Examiner*—Gregory Morse
*Assistant Examiner*—Jacob Lipman
(74) *Attorney, Agent, or Firm*—Hickman Palermo Truong & Becker LLP

(57) ABSTRACT

A stream cipher encryption method and apparatus that can efficiently seek to arbitrary location in a keystream, and a method of generating an arbitrary segment of keystream.

62 Claims, 10 Drawing Sheets

*(Prior Art)*

STREAM CIPHER ENCRYPTION METHOD AND APPARATUS THAT CAN EFFICIENTLY SEEK TO ARBITRARY LOCATIONS IN A KEY STREAM

FIELD OF INVENTION

The present invention generally relates to cryptology. The invention relates more specifically to a stream cipher encryption method and apparatus that can efficiently seek to arbitrary locations in a keystream, including a method of generating an arbitrary segment of keystream for use by a stream cipher in encryption or decryption.

BACKGROUND OF THE INVENTION

Stream ciphers convert a plaintext to a ciphertext one bit at a time. In general, a stream cipher has a keystream generator that outputs a keystream consisting of a series of bits that, for perfect security, vary in value in an unpredictable manner. Each keystream bit is combined using a Boolean exclusive-OR operation (XOR) with an incoming bit of the plaintext, resulting in an output bit of the ciphertext. Thus, an additive stream cipher encrypts a plaintext by bitwise adding a pseudo-randomly generated keystream into the plaintext, modulo two.

For decryption, the ciphertext bits are XORed with an identical keystream to recover the plaintext bits. Accordingly, a stream cipher is ideally suited to encrypting a continuing stream of data, such as the data passing over a network connection between two computers or other network elements. Also, the security of a stream cipher resides in the randomness of the keystream, however, the keystream must be reproducible in identical form at decryption time. Therefore, design of the keystream generator is essential to security and practical operation.

FIG. 1A is a simplified block diagram of a stream cipher. A key K 401 is fed to keystream generator 402, which outputs keystream 410. Plaintext 412 is encrypted by an encryption function 416 based on keystream 410. As a result, ciphertext output 414 is produced.

The keystream generator of such a stream cipher can be described in terms of a state update function and an output function. For example, in FIG. 1A, keystream generator 402 has internal state information 404, a next state function 406 (state update function), and output function 408. The state update function maps the internal state of the keystream generator at one instant to its next value. The output function maps the internal state to a segment of keystream, and the keystream is defined as the concatenation of the values of the output function. Further background information on stream ciphers is provided in B. Schneier, "Applied Cryptography: Protocols, Algorithms and Source Code in C," $2^{nd}$ ed. (New York: John Wiley & Sons, 1996).

Block ciphers such as the Data Encryption Standard (DES) are popularly used for encryption of computer communications. However, empirical evidence indicates that stream ciphers are faster than block ciphers at equivalent security levels. For example, in practical evaluation, the stream ciphers RC4 and SEAL have been determined to be significantly faster than any secure block cipher when implemented on general-purpose computer processors. Further, RC4 and SEAL have survived years of scrutiny by cryptanalysts. SEAL is described in U.S. Pat. No. 5,454,039; U.S. Pat. No. 5,675,652; U.S. Pat. No. 5,835,597; Rogaway, P. and Coppersmith, D., "A Software-Optimized Encryption Algorithm", Proceedings of the 1994 Fast Software Encryption Workshop, Lecture Notes in Computer Science, Volume 809, Springer-Verlag, 1994, pp. 56–63; Rogaway, P. and Coppersmith, D., "A Software-Optimized Encryption Algorithm", Journal of Cryptology, Volume 11, Number 4, Springer-Verlag, 1998, Pages 273–287, and at the document seal-abstract.html in the directory/~rogaway/papers/ of the "www.cs" subdomain of the Internet domain ucdavis.edu. Both SEAL and RC4 are discussed in Schneier.

Further, theoretically, a stream cipher is inherently immune to a chosen plaintext attack, and can contain more state information than a block cipher. A block cipher needs to have both encryption and decryption to be secure, and needs to have the avalanche property from the middle to both ends. For example, changing a single bit in the middle of the cipher should change each bit of the input and the output with probability of about ½. Also, the stream cipher has the advantage that its outputs are ordered, while a block cipher must be able to efficiently compute every possible output in any possible order. As a result, for many applications stream ciphers are now clearly preferable over block ciphers.

Unfortunately, many stream ciphers have a significant limitation; most cannot efficiently seek to an arbitrary location in their keystream. In this context, seeking to an arbitrary location in the keystream means generating a segment of keystream that is conceptually located an arbitrary number of bits ahead of that portion of keystream that would be generated by ordinary operation of the keystream in its then-current state. This capability is required for numerous practical applications. For example, in a communications protocol that uses unreliable transport, there is no guarantee that data packets of a particular flow will arrive in order, or arrive at all. Examples of such protocols include Internet Protocol (IP), UDP, and RTP. Such protocols commonly experience loss and reorder of packets in practice. Therefore, for a flow that includes successive packets a, b, and c, a cipher may need to encrypt packet c before it encrypts packet b. A stream cipher can be used to provide privacy for data communicated using such protocols, if the cipher can seek to the proper location in the keystream for packet c based on a sequence number.

Similarly, an encrypted disk partition or file system can use a stream cipher if the cipher supports the seek operation.

These examples do not require the random access capability of a block cipher, in which all inputs are equally simple to compute. Rather, the example applications require the capability to seek into the keystream, with a seek time that is not significant relative to the time required to generate the keystream itself. In this context, "seek" is used in the same sense as used in the POSIX and ANSI C functions for repositioning the offset of a file descriptor.

In one past approach to providing a stream cipher with a seek capability, the state update function is made linear in some field. In this approach, a seek is a composition of linear operations, and therefore is itself linear. This approach is similar to using a block cipher in counter mode, which imposes requirements on the output function that are similar to the requirements on block ciphers.

In an alternative approach, as taken by Rogaway et al. in the design of the SEAL cipher, a special seek function is defined that pseudo-randomly maps an index and a fixed key to an internal state of a keystream generator. Based on this state information, the keystream generator can generate a length of keystream. The keystream for the cipher is defined to be the concatenation of the keystreams generated for each index, with indices in ascending order. Effectively, this approach creates a stream cipher that can seek to some regularly spaced locations in its keystream.

While this approach is satisfactory for many applications, some applications may require the ability to seek to an arbitrary location in the keystream. For example, an encrypted database containing many small records could have this requirement. In addition, the seek function approach adds security requirements. The seek function itself must be secure, and the seek and advance functions must be such that they do not interact in an insecure way.

Based on the foregoing, there is a clear need for an additive stream cipher method that can seek to an arbitrary location in its keystream.

There is a specific need for a stream cipher that provides a keystream seek capability without using a linear state update function, and without a special seek function.

There is also a need to provide such a stream cipher in an embodiment that achieves excellent performance when executed in software implemented for general-purpose computer processors.

SUMMARY OF THE INVENTION

The foregoing needs, and other needs and objects that will become apparent for the following description, are achieved in the present invention, which comprises, in one aspect, a method of automatically generating a keystream segment of an arbitrary location of a complete keystream of an additive stream cipher. A location value that identifies a location of the keystream segment within the complete keystream is received. A state value for a leaf node of a balanced binary tree is created and stored, wherein the leaves of the tree represent the complete keystream and the leaf node represents the keystream segment at the location, by a traversal of the tree from root node to the leaf node wherein a leftward tree branch transition comprises computing a first non-linear function and a rightward tree branch transition comprises computing a second non-linear function. The keystream segment is created and stored by applying a third function to the state value of the leaf node. The entire keystream can be efficiently computed, in order, via a preorder traversal of the tree.

According to another aspect, the invention provides a stream cipher encryption method and apparatus that can efficiently seek to arbitrary locations in a keystream. A segment of plaintext is received, along with information indicating where the segment of plaintext is located within a complete plaintext. Based on the location information, a keystream segment for that location is created and stored. The segment of plaintext is then enciphered by combining the keystream segment with the plaintext segment using an exclusive OR operation, resulting in creating and storing a segment of ciphertext.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A stream cipher encryption method and apparatus that can efficiently seek to arbitrary locations in a keystream, and a method of generating an arbitrary segment of keystream, are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

COMPUTATION TREE APPROACH

An improved additive stream cipher is defined in part by a keystream generating approach that uses a balanced binary tree.

Figure 1A:
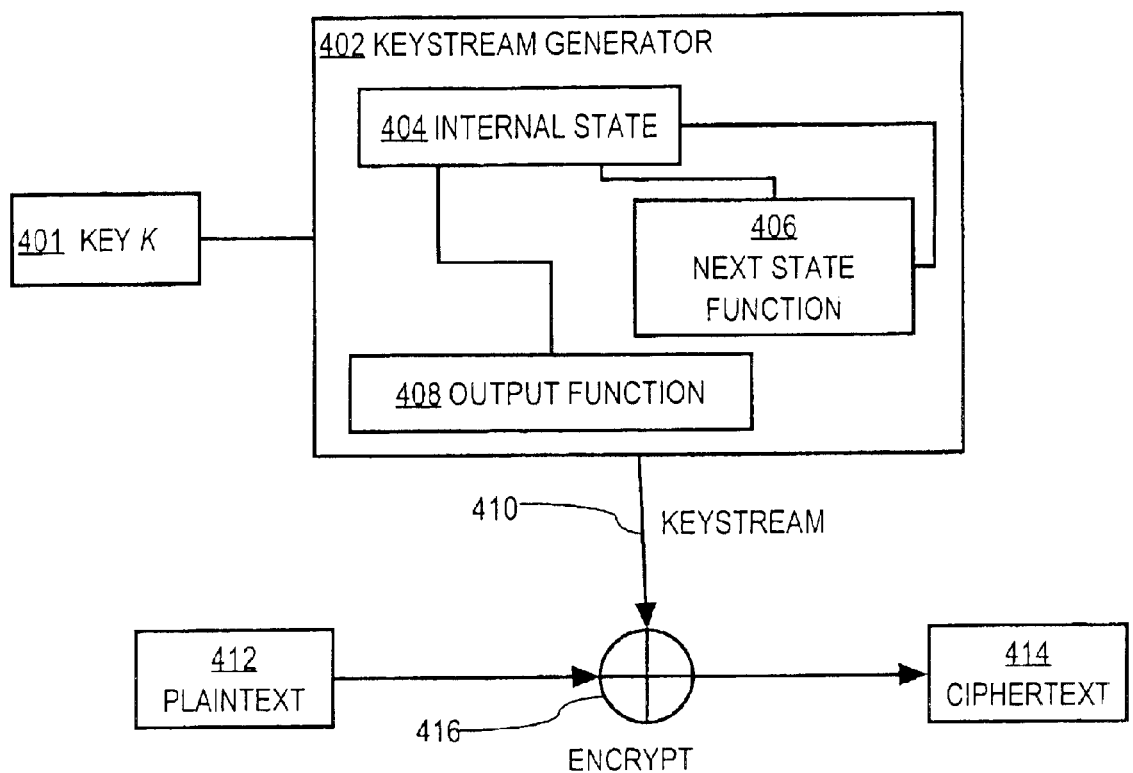
FIG. 1A is a simplified block diagram of a stream cipher.
Figure 1B:
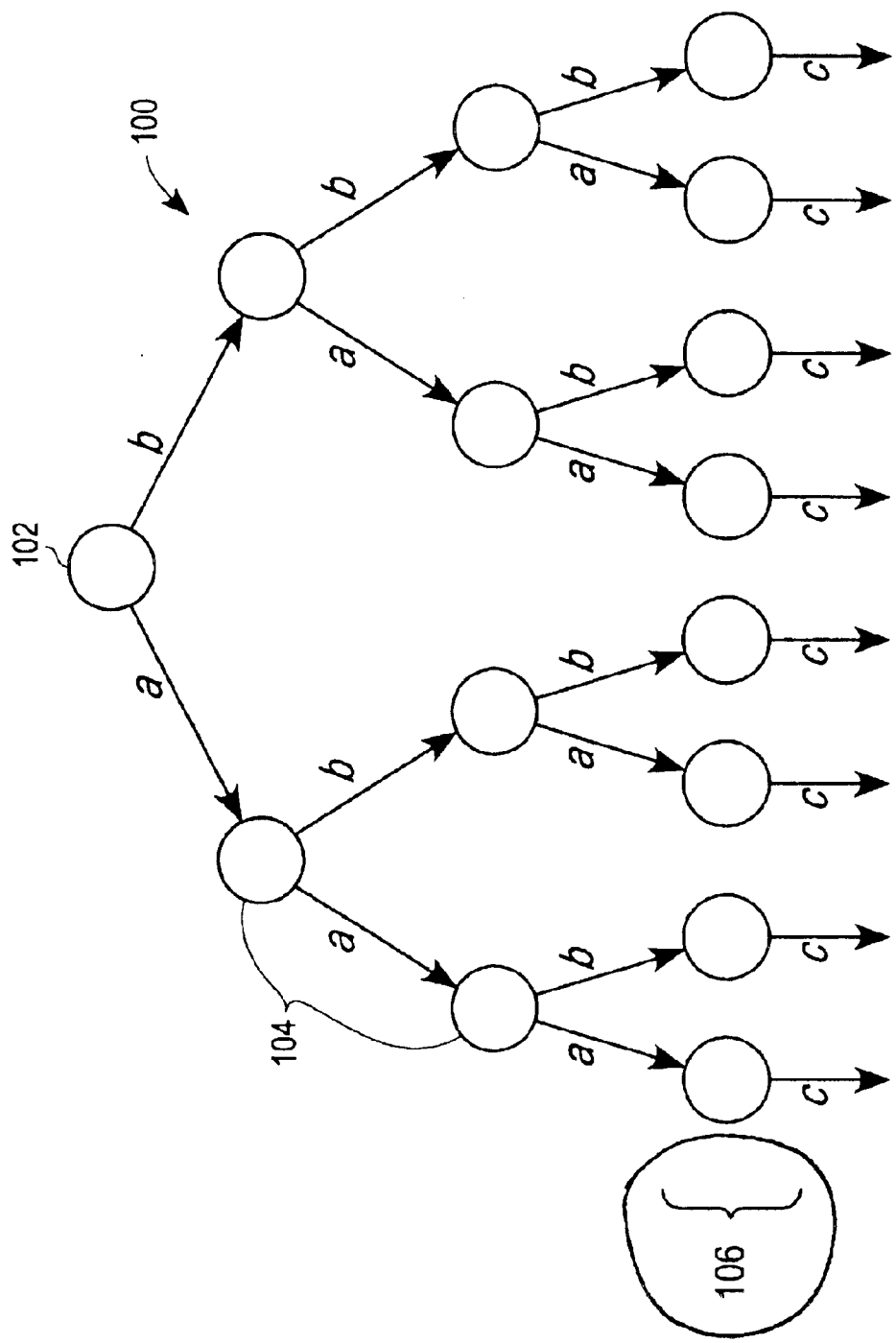
FIG. 1B is a block diagram of a portion of a balanced binary tree that may be used in one embodiment.

FIG. 1B is a block diagram of a portion of a balanced binary tree that may be used in one embodiment. In the example tree 100 of FIG. 1, root node 102 has fixed state information. Each intermediate node 104 provides a transition path from root node 102 to two of a plurality of leaf nodes 106. Each leaf node 106 represents and is associated with a small length of keystream.

Computation of a keystream segment at a specified location within the complete keystream is carried out by computing from the root node 102 to one of the leaf nodes 106 that is associated with the specified location, then computing the rest of the nodes using a pre-order tree traversal. Thus seeking to a location in the keystream is equivalent to computing the state for a particular leaf 106 in the tree 102, a computation that requires computational effort that is logarithmic in the size of the keystream.

The root node 104 and each leaf node 106 contain m bits of state information. A left branch of tree 102 is computed using the nonlinear function $$GF(2^m) \rightarrow GF(2^m) \qquad a$$

and a right branch is computed using the nonlinear function $$GF(2^m) \rightarrow GF(2^m) \qquad a$$

The outputs of the cipher are computed by applying the function $$GF(2^m) \rightarrow GF(2^r) \qquad a$$

to the state information of the leaf nodes, which maps the n internal bits to an output of size r. Accordingly, in FIG. 1B, leftward transitions from node to node have reference label a to indicate that such transitions involve computing function a. Similarly, rightward transitions from node to node have reference label b to indicate that such transitions involve computing function b. Exit paths from leaf nodes 106 have reference label c to indicate that such paths involve computing function c.

Generating a complete keystream in order is done by a preorder traversal of the entire tree, starting at the root. A binary tree with height h contains $2^h-1$ nodes, $2^{h-1}$ leaves, and $2^{h-1}-2$ edges. In this context, a tree with one node is defined as having height one. Each edge is computed exactly once in a traversal of the tree. Therefore, the present approach can generate keystream at a rate of approximately:

$$\frac{r2^{h-1}}{R_c 2^{h-1} + R_{ab}(2^h - 2)} \cong \frac{r}{R_c + 2R_{ab}}$$

where $R_c$ is the rate at which the function c can be evaluated, and $R_{ab}$ is the average rate at which the functions a and b can be evaluated.

In one embodiment, the tree is implemented by creating and storing a stack in memory of h elements, the $i^{th}$ element of which contains the state information of the node on the $i^{th}$ path from the root to the leaf corresponding to the current output. Thus, the computation tree defines a cipher with mh bits of internal state, wherein the state update function modifies only a portion of the current state. An important implementation consideration is that the preorder traversal is readily adaptable to parallel processing.

The functions a and b are comparable to the round functions of a substitution-permutation network. They are the main source of non-linearity in the cipher disclosed herein. The function c can be used to hide the internal state, as it has fewer outputs than inputs.

CIPHER PROCESSING FUNCTIONS AND KEY SETUP APPROACH

In one embodiment, a stream cipher that can seek to an arbitrary location in its keystream involved computing functions a, b, and c, and a key setup approach.

Improved Cipher Processing Approach

Some general-purpose central processing units, such as the Intel x86 family of processors, have no more than seven (7) available registers. In one specific embodiment, a cipher approach is optimized to operate with seven registers. Accordingly, in this embodiment, the present approach achieves high throughput on general-purpose processors.

Figure 1C:
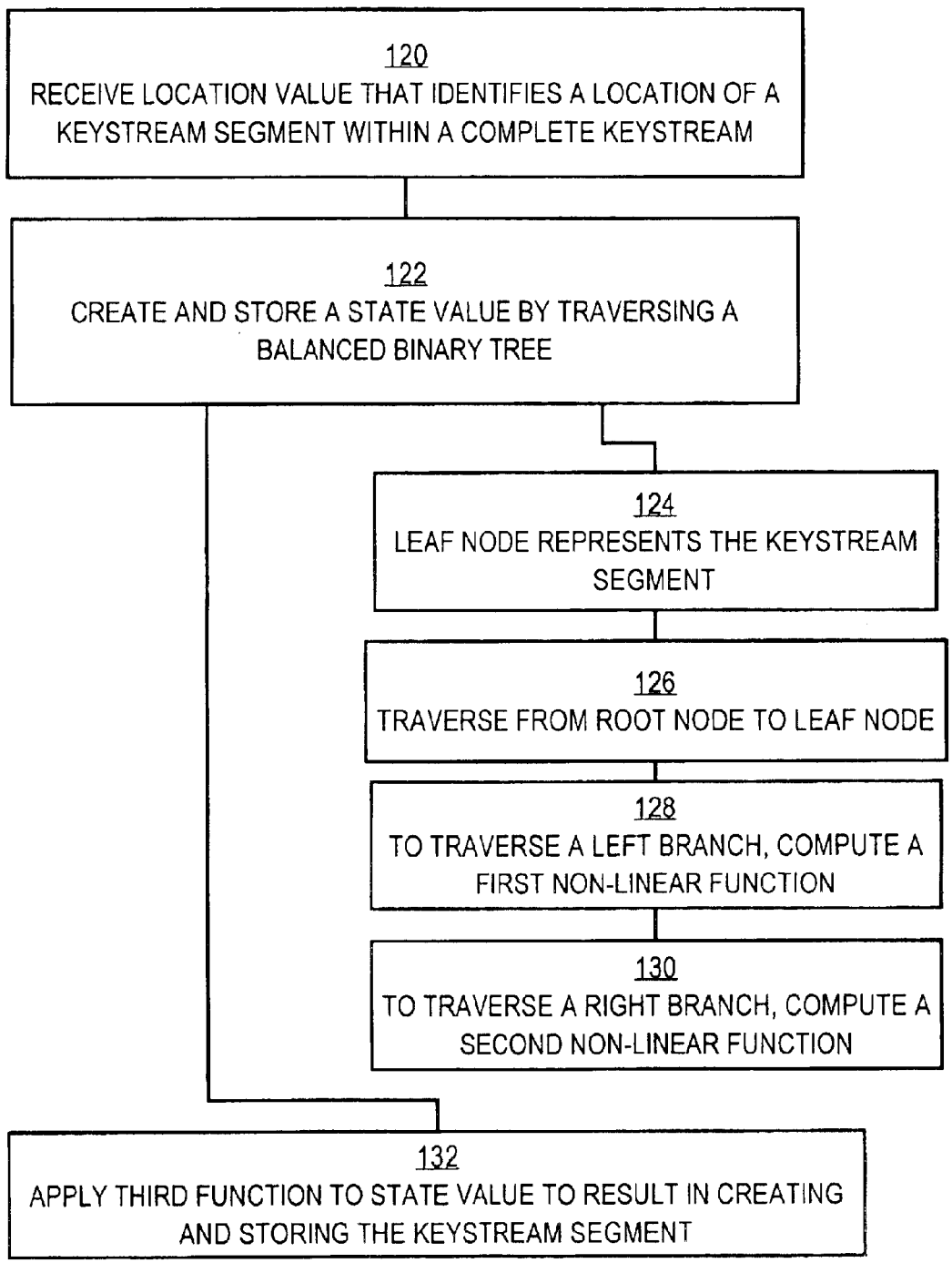
FIG. 1C is a flow diagram of a method of generating a segment of a keystream.

FIG. 1C is a flow diagram of a method of generating a segment of a keystream. In block 120, a location value that identifies a location of a keystream segment within a complete keystream is received. In data communication applications, the location value may comprise a packet identifier that indicates the relative order, within a flow of packets, of a packet that has been received out of order with respect to other packets in the flow.

In block 122, a state value is created and stored by conceptually traversing a balanced binary tree that represents the complete keystream. As stated in block 124, a leaf node in the tree represents the keystream segment. Traversal proceeds from the root node to the leaf node associated with the specified keystream segment, as shown in block 126. To traverse a left branch, a first non-linear function is computed, as shown by block 128. To traverse a right branch, a second non-linear function is computed, as shown by block 130.

In block 132, a third function is applied to the state value, to result in creating and storing the keystream segment.

Figure 1D:
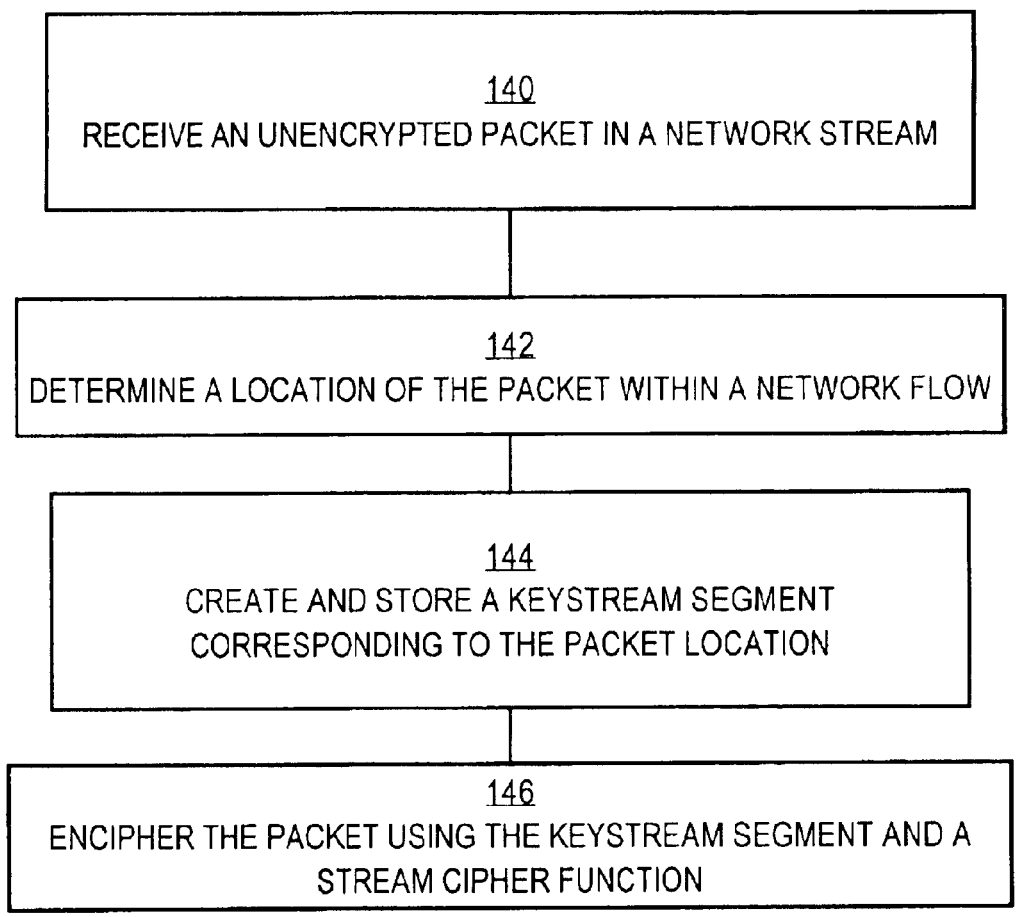
FIG. 1D is a flow diagram of a method of encrypting network communications.

FIG. 1D is a flow diagram of a method of encrypting network communications.

In block 140, an unencrypted packet is received as part of a stream of network communications. Block 140 may involve receiving one or more packets at any suitable network device or end station, such as a router, switch, gateway, server, etc. Also, the unencrypted information may comprise a portion of a packet, e.g., a payload of a packet wherein the header is treated separately.

In block 142, a location of the packet within a network flow is determined. Block 142 may involve, for example, determining the order of a particular packet within a larger flow of multiple packets, where the packets are received out of order.

In block 144, a keystream segment corresponding to the packet location is created and stored. Block 144 may involve carrying out the steps of FIG. 1C in order to generate a segment of keystream appropriate for the received packet.

In block 146, the packet is encrypted or enciphered using the keystream segment as applied to a stream cipher function. Block 146 may involve encrypting only the payload of a packet.

The process of FIG. 1D and the other processes described herein are applicable to encryption of packets that form portions of voice over Internet Protocol flows in network communications as part of the IPSec protocol, and for the encryption of unreliable network traffic in general, for example, traffic transported using the UDP protocol.

In one embodiment, the number m of bits of state per node, and the key size, are specified by parameter values. The parameterizable width enables reduced size versions of the cipher to be studied, enabling numerical experiments on the cipher to be more meaningful. The parameterizable key size is useful to adapt the cipher to different security policies, and to protect against typical plaintext attacks by enabling keys to be increased in size to compensate for the possibility of cryptographic attacks that use precomputation. See, e.g., D. McGrew et al., "Attacks on Linearly Redundant Plaintext and Implications on Internet Security," the Proceedings of the Seventh Annual Workshop on Selected Areas in Cryptography.

Accordingly, in one embodiment, m is restricted to being a multiple of twelve, because of the internal structure of the functions a and b. In the description herein, x, y and z denote n bit quantities, and each node 104, 106 of tree 100 has m=3n bits of state denoted as z|y|x, where the symbol | denotes concatenation, and n is a multiple of four.

In one embodiment, the state contained by each node 102, 104, 106 of tree 100 contains a unique node number to ensure that two distinct nodes cannot have the same state. The node number is denoted as z, and counted as part of the state of the node to which it corresponds. The node number of the root node 102 is defined as one. If the node number of a node is z, that of its left child is 2z and that of its right child is 2z+1. Functions of the cipher use substitution, rotation, and addition modulo $2^n$. The "filter" function c is defined as the linear reduction of 2n bits to 2 bits. The branching functions a and b are defined as the composition of a diffusion function d with the nonlinear "confusion" functions $f$ and $g$. Thus, $a = f \circ d$ and $b = g \circ d$ The definitions of factions $f$, $g$, $d$, and $c$ are $f(z|y|x)=2z|S(R(S(R(y))))|L(S(L(S(x))))$ $g(z|y|x)=2z+1|L(S(L(S(y))))|S(R(S(R(\overline{x}))))$ $d(z|y|x)=z|x+y+z|2x+y+z$ $c(z|y|x)=x\oplus y$ where integer addition module two is denoted as +, bitwise exclusive-or is denoted as $\oplus$, and bitwise complementation is denoted as $\overline{\phantom{x}}$. The functions R and L indicate rotation by n/4 bits and to the right and left, respectively (where "right" means in the direction of the least significant bit). The nonlinear function S is implemented as a key-dependent substitution table.

Figure 2:
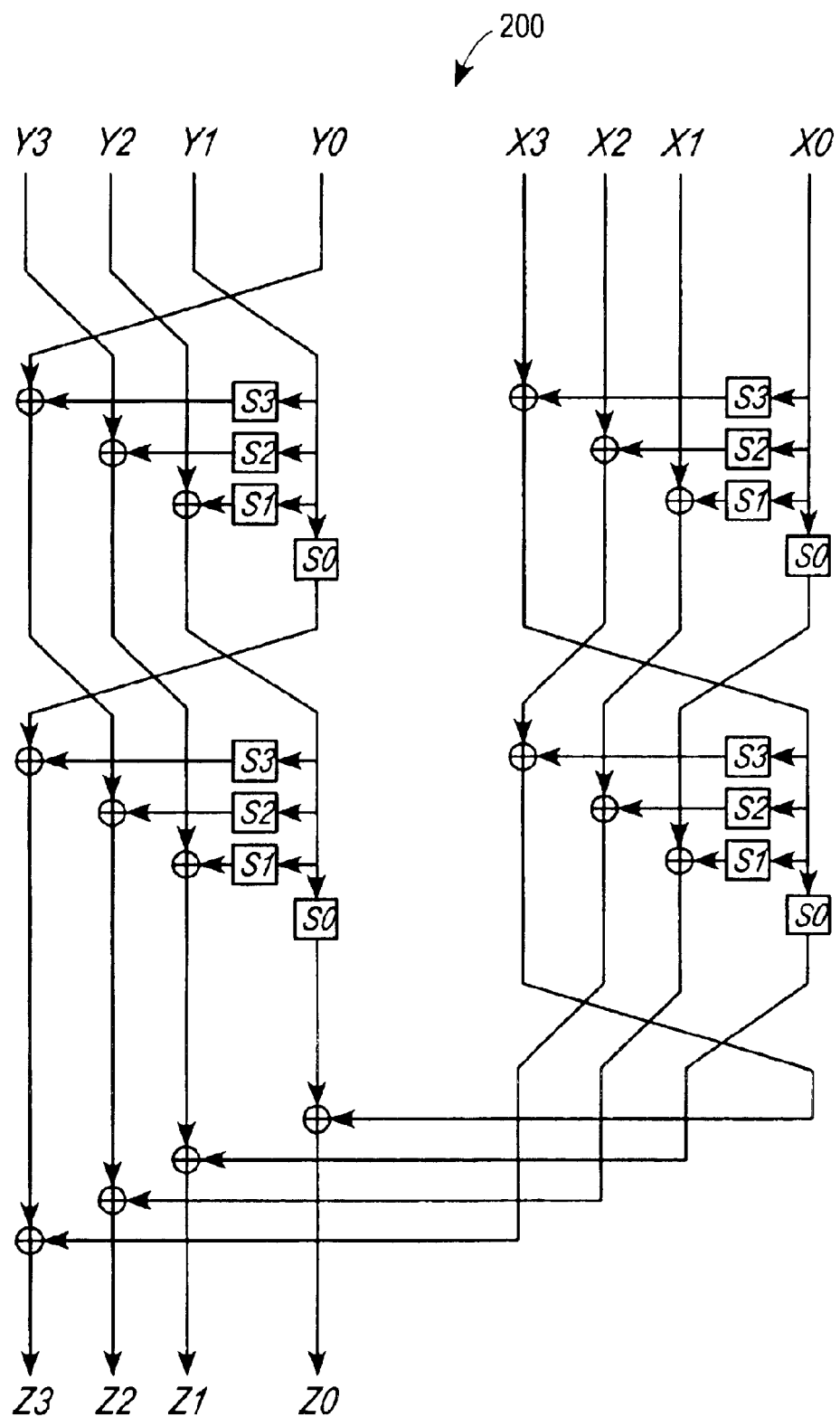
FIG. 2 is a computational graph diagram that illustrates one embodiment of a function $c \circ f$.
Figure 3:
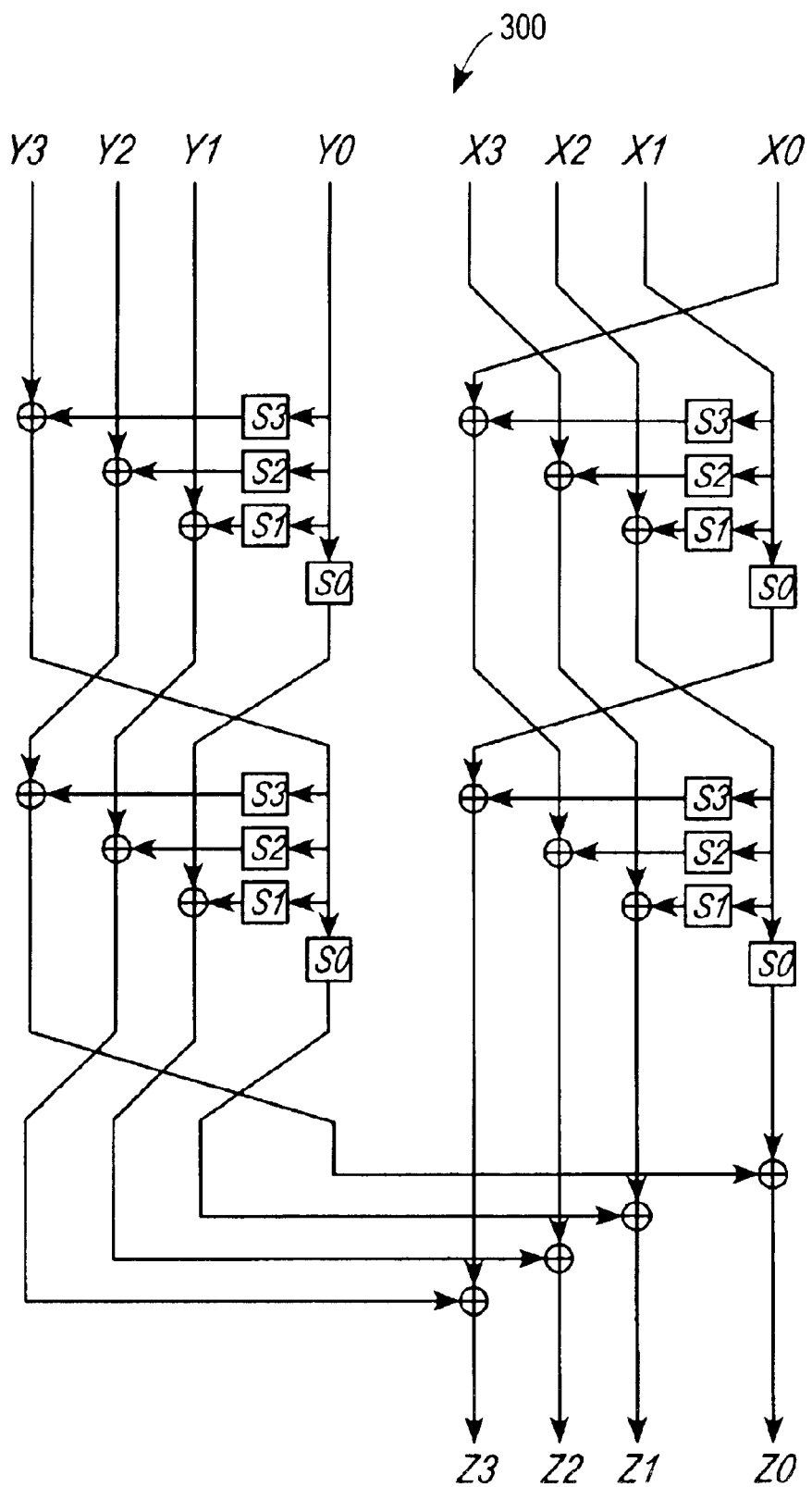
FIG. 3 is a computational graph diagram that illustrates one embodiment of a function $c \circ g$.
Figure 4:
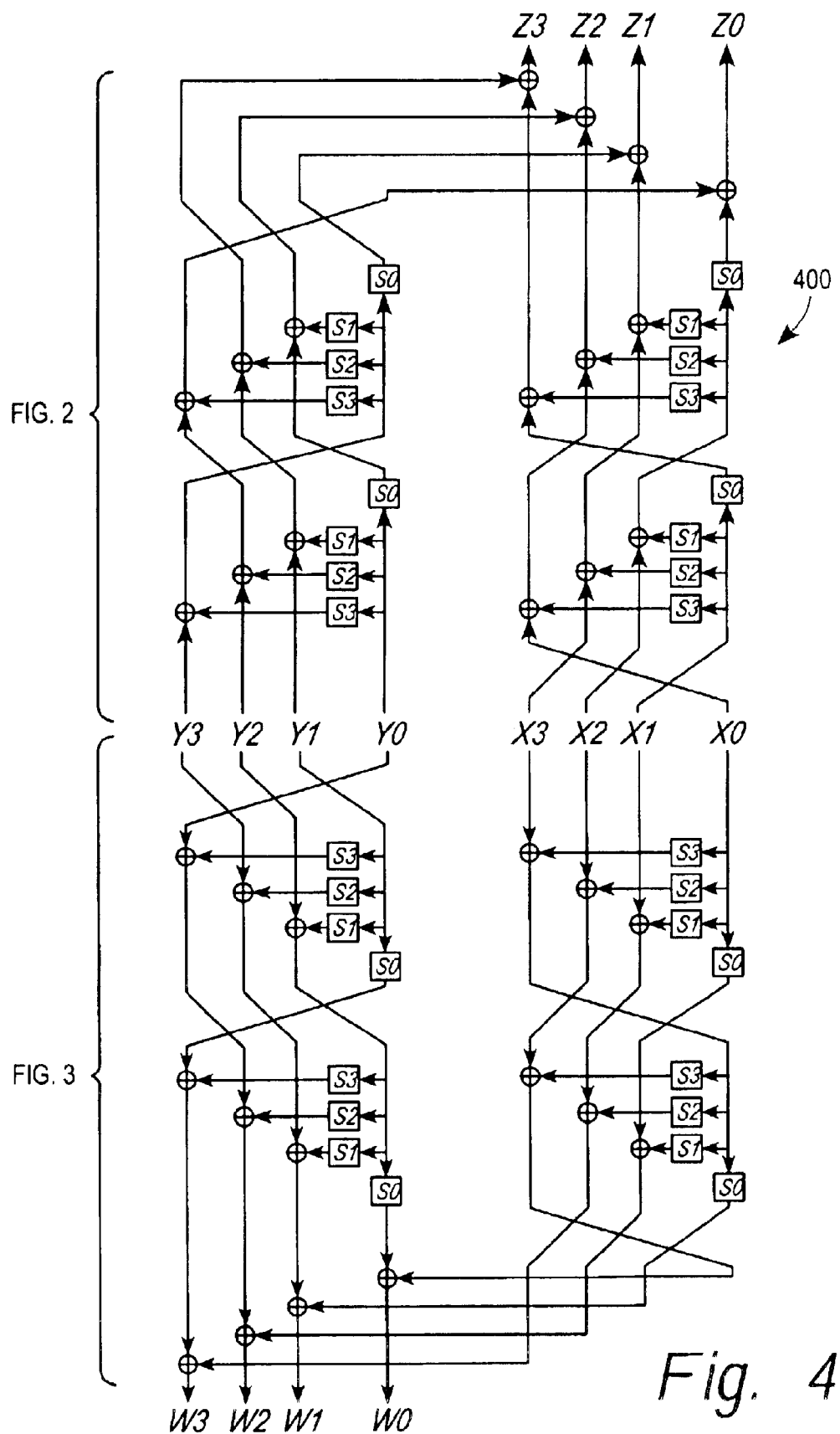
FIG. 4 is a computational graph diagram that illustrates a concatenation of FIG. 2 and FIG. 3.
Figure 5:
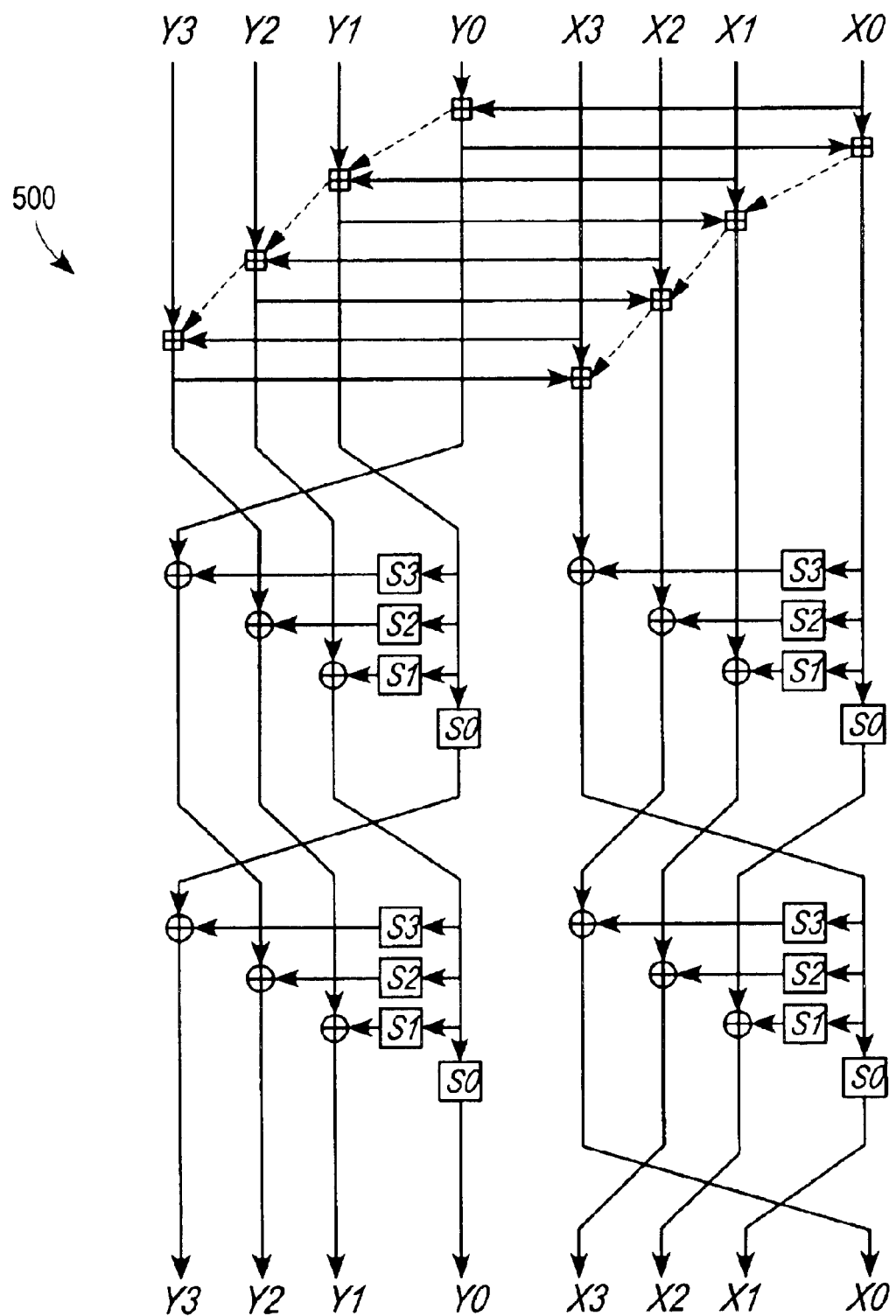
FIG. 5 is a computational graph diagram that illustrates one embodiment of a function $f \circ d$.
Figure 6:
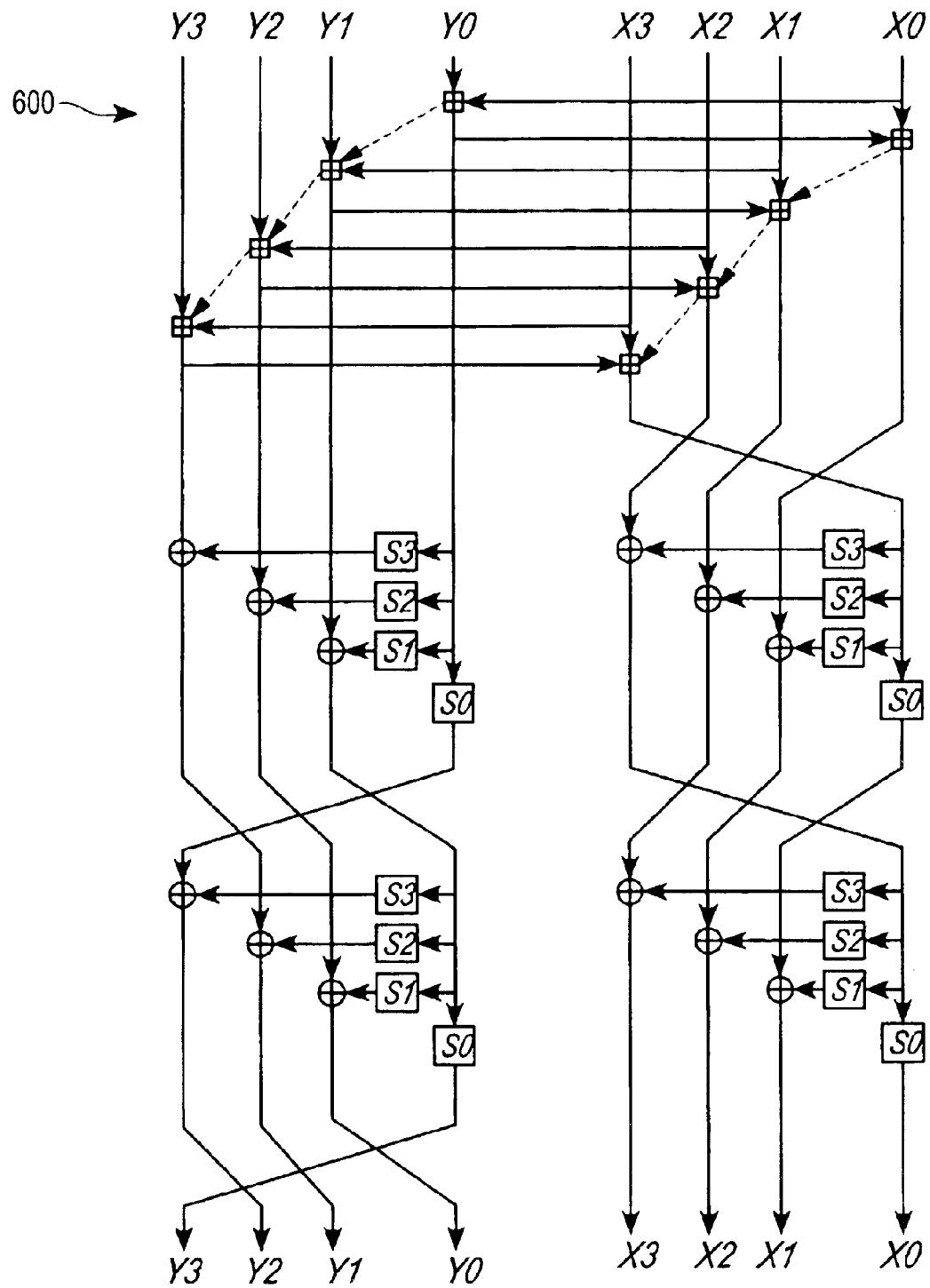
FIG. 6 is a computational graph diagram that illustrates one embodiment of a function $g \circ d$.

The filter function c is a bitwise exclusive or of x and y. The composition of c with $f$ and $g$ is shown in FIG. 2, FIG. 3. Specifically, FIG. 2 is a computational graph diagram that illustrates one embodiment of the function c∘f, as indicated by reference numeral 200, and FIG. 3 is a computational graph diagram that illustrates one embodiment of the function c∘g, designated by reference numeral 300. FIG. 4 is a computational graph diagram that illustrates a concatenation of FIG. 2 and FIG. 3 (reference numeral 400). FIG. 5 is a computational graph diagram that illustrates one embodiment of the function $f$∘d (reference numeral 500). FIG. 6 is a computational graph diagram that illustrates one embodiment of the function g∘d, as indicated by reference numeral 600.

In FIG. 2, FIG. 3, FIG. 4, FIG. 5, and FIG. 6, inputs X0, X1, X2, X3 represent the bytes of x, where X0 is the least significant byte, X1 is the second least significant, and so on. Similarly, inputs Y0, Y1, Y2, Y3 represent the bytes of variable y, from least significant to next least significant, and inputs Z0, Z1, Z2, Z3 represent bytes of variable z. The function S depends only on the lowest n/4 bits of its argument, and can be viewed as four component functions S0, S1, S2, S3, as indicated by like labeled blocks in FIG. 2, FIG. 3, FIG. 4, FIG. 5, and FIG. 6. A key setup approach is defined such that component functions S0, S1, A2, S3 are invertible.

FIG. 2 and FIG. 3 illustrate how the output of the cipher disclosed herein is derived from the state of the leaf nodes using one embodiment off, g, and c. The structures off, g, and c are optimized, in this embodiment, to resist up and down attacks. Referring to FIG. 3, the variables at the top and bottom (z, w) represent two adjacent n-bit outputs of the cipher. The state at the middle of the network, represented by x, y, is the output of the function d for each of the leaves.

The manner in which the functions $f$ and $g$ use a substitution table is similar to that of the block cipher WAKE, which is described in B. Schneier, supra, at 400,. However, in the approach described herein, greater parallelism and lower register usage is achieved by using the substitution table to modify the value of its argument.

Key Setup

Key setup consists of generating four invertible functions, and storing them in concatenated form in a substitution table. The substitution operation herein maps a single variable x to x $\oplus$ s(x), for some substitution table s that depends only on the lowest 8 bits of x. Thus, invertibility requires that the function mapping the lowest 8 bits of x to lowest 8 bits of x $\oplus$ s(x) be invertible. This is achieved by pseudorandomly selecting an invertible function mapping 8 bits to 8 bits, then composing that function with the bitwise exclusive-or function. Invertible functions are pseudorandomly generated by swapping elements at random in the table, an approach similar to that of the RC4 next-state function.

Detailed pseudocode for this method follows, in which S0, S1, S2, and S3 are the substitution tables described above, 'key' represents the raw key, and i, j, k, and 'index' are integers between zero and 255. The symbol % denotes the modulus operator. The number of bytes in a key is represented here by the symbol bytes in key, which is a parameter of this method.

PSEUDOCODE FOR KEY SETUP 1. (initialize substitution tables to zero)
for i from 0 to 255
   set S0[i] to 0
   set S1[i] to 0
   set S2[i] to 0
   set S3[i] to 0
endfor
2. (set substitution tables to key-dependent permutations)
for j from 0 to 255
   for i from 0 to 255
   set S3[i] to S2[i]
   set S2[i] to S1[i]
   set S1[i] to S0[i]
   set S0[i] to i
   endfor
   set index to j
   for k from 1 to num_passes
   for i from 0 to 255
   set index to index+(key[i % bytes_in_key]+S0[i]) % 255
   set tmp to S0[i]
   set S0[i] to S0[index]
   set S0[index] to tmp
   set tmp to S1 [i]
   set S1[i] to S1[index]
   set S1[index] to tmp
   set tmp to S2[i]
   set S2[i] to S2[index]
   set S2[index] to tmp
   set tmp to S3[i]
   set S3[i] to S3[index]
   set S3[index] to tmp
   endfor
   endfor
endfor
3. (set S0 equal to the xor of itself with the identity permutation)
for i from 0 to 255
   set S0[i] to the value of S0[i] exclusive-ored with i
endfor C language computer program source code for an example of a key setup approach is presented in Appendix A.

Performance

The functions $f$ and $g$ can each be computed in seven instructions on a general purpose CPU that can issue two instructions simultaneously, using five registers (holding x, y, z, a temporary variable, and a pointer to the substitution table). The theoretical encryption rate is about fifteen cycles per byte (using two execution units).

HARDWARE OVERVIEW

Figure 7:
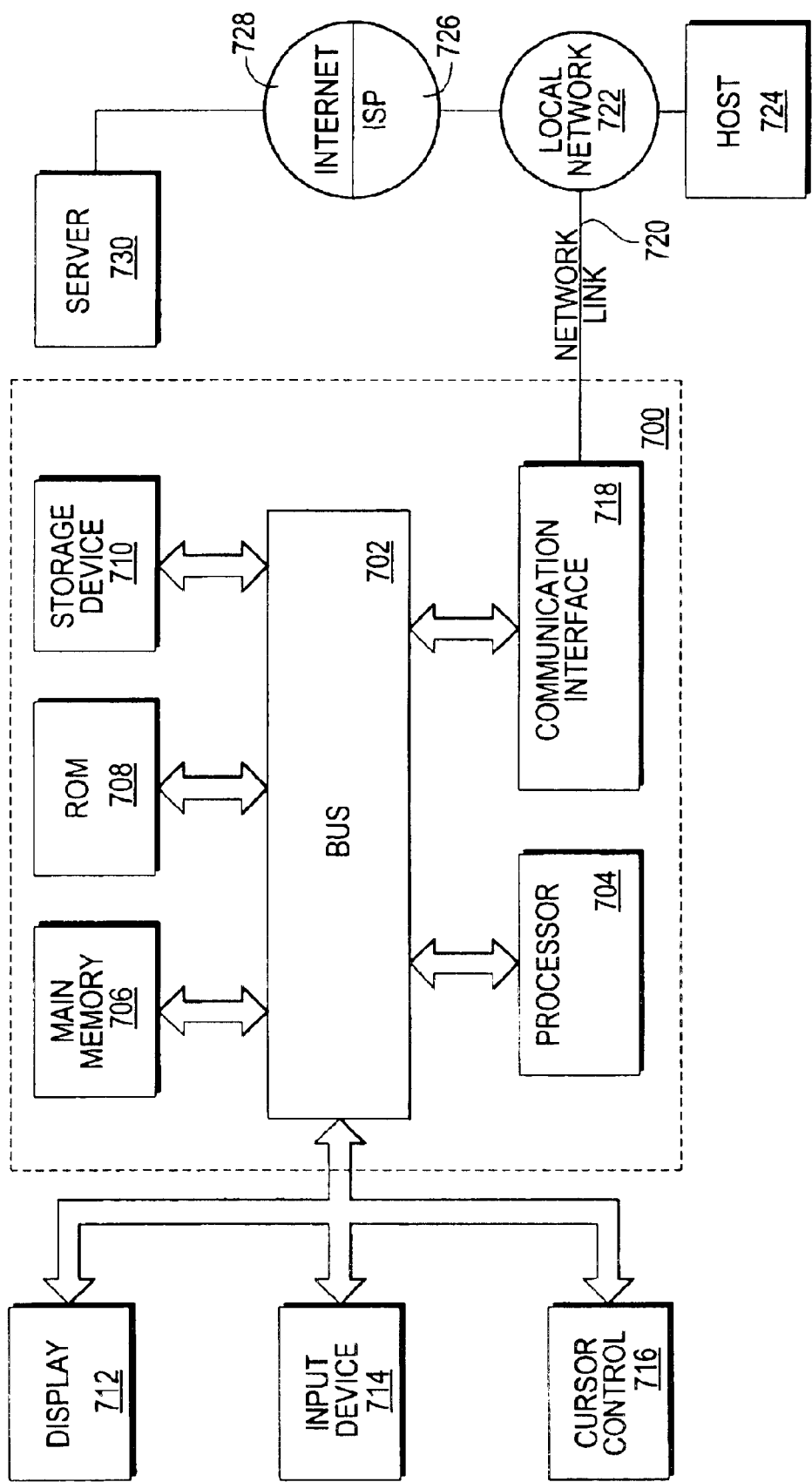
FIG. 7 is a block diagram that illustrates a computer system upon which an embodiment may be implemented.

FIG. 7 is a block diagram that illustrates a computer system 700 upon which an embodiment of the invention may be implemented.

Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for performing a stream cipher encryption method and apparatus that can efficiently seek to arbitrary locations in a keystream, and a method of generating an arbitrary segment of keystream. According to one embodiment of the invention, performing a stream cipher encryption method and apparatus that can efficiently seek to arbitrary locations in a keystream, and a method of generating an arbitrary segment of keystream, are provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for carrying out a stream cipher encryption method and apparatus that can efficiently seek to arbitrary locations in a keystream, and a method of generating an arbitrary segment of keystream.

The received code may be executed by processor 704 as it is received, and/or stored in storage device 710, or other non-volatile storage for later execution. In this manner, computer system 700 may obtain application code in the form of a carrier wave.

OTHER EMBODIMENTS AND MODIFICATIONS

Accordingly, a fast stream cipher that can efficiently seek to arbitrary locations in its keystream has been described. Unlike RC4, which cannot seek at all, and SEAL, which can seek only to a limited number of locations in the keystream, the approach described herein can seek to any location in the keystream. The cipher can efficiently seek to arbitrary locations in its keystream despite the fact that it does not use a linear state update function. This property is apparent from the architecture of the cipher in which its computation graph may be represented by a tree. Keystream can be efficiently generated using a preorder traversal of the tree, and the tree structure lends itself to parallelization.

Implementations may be embodied in one or more hardware circuits, one or more field programmable gate arrays (FPGAs), or in one or more software programs or processes. Any such implementation may be parallelized, offering significant gains in performance, as a result of the tree structure of the computations.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Appendix A: Source Code

The ANSI C source code for the functions $f$, $g$, $d$ and $h$ is given below, in which each function is implemented using a macro. In these definitions, a and b are 32-bit unsigned integers (or unit32_ts, in POSIX terminology), and the function F is represented by the array F[256] of 32-bit unsigned integers. The macros ROT8 and ROT24 implement rotation by eight bits and twenty-four bits, respectively, where the direction of rotation is towards the most significant bit.

```
#define ROT8(x)     (((x) << 8)  | ((x) >> 24))
#define ROT24(x)    (((x) << 24) | ((x) >> 8))
#define f(x, y, z, F) (           \
    z += z,                       \
    y = ROT24(y),                 \
    x ^= F[x & 0xFF],             \
    y ^= F[y & 0xFF],             \
    y = ROT24(y),                 \
    x = ROT8(x),                  \
    x ^= F[x & 0xFF],             \
    y ^= F[y & 0xFF],             \
    x = ROT8(x)                   \
)
#define g(x, y, z, F) (           \
    z += (z+1),                   \
    x = ~x;                       \
    x = ROT24(x),                 \
    x ^= F[x & 0xFF],             \
    y ^= F[y & 0xFF],             \
    x = ROT24(x),                 \
    y = ROT8(y),                  \
    x ^= F[x & 0xFF],             \
    y ^= F[y & 0xFF],             \
    y = ROT8(y)                   \
)
#define d(x, y, z) (              \
    x += z,                       \
    y += x,                       \
    x += y                        \
)
#define h(a, b) (a ^ b)
```

The source code to produce the jth word of output (that is, bytes $4j$ through $4j+3$) is given below, where j is represented by the variable leaf_num.

```
uint32_t
leviathan_output(int leaf_num) {
    int i;
    uint32_t x, y, z;
    i = 1 << (LEVIATHAN_HEIGHT-1);
    x = y = 0;
    z = 1;
    while (i > 0 ) {
        d(x, y, z);
        if (i & leaf) {
            g(x, y, z, F);    /* right */
        } else {
            f(x, y, z, F);    /* left */
        }
        i >>= 1;
    }
    return h(x, y);
}
```

Source code for an embodiment of a key setup routine follows. Here, key is a pointer to an unsigned character string of length bytes_in_key, and F is an array of TABLE_SIZE words.

```
#define TABLE_SIZE 256
#define NUM_PASSES 2
void init_leviathan_key(const unsigned char *key,
                size_t bytes_in_key, word *F) {
    int i, j, k, index;
    word tmp;
    for (i=0; i<TABLE_SIZE; i++)
        F[i] = 0;
    /*
     * Each iteration of this loop we form the permutation of one line
     * (and, incidentally, also permute previously formed lines)
     */
    for (j=0; j<4; j++) {
        /*
         * Initialize the new line to the identity permutation, and
         * shift the existing lines over one
         */
        for (i=0; i<TABLE_SIZE; i++)
            F[i] = F[i] * TABLE_SIZE + i;
        /*
         * Initialize index to a line-dependant value, so that the
         * four lines will get distinct permutations
         */
        index = j;
        /*
         * Do the byte-swapping NUM_PASSES times, using the new
         * line as the index
         */
        for (k=0; k<NUM_PASSES; k++) {
            for (i=0; i < TABLE_SIZE; i++) {
                index += (key[i % bytes_in_key] + F[i]);
                index &= (TABLE_SIZE-1);
                tmp = F[i];
                F[i] = F[index];
                F[index] = tmp;
            }
        }
    }
    /*
```

-continued

```
 * Finally, set S0 equal to the xor of itself with the
 * identity permutation, so that (S0[x] ^ x) is a permutation.
 */
    for (i=0; i < TABLE_SIZE; i++)
        F[i] ^= i;
}
```

Appendix B: Test Vectors

The key represented by the hexadecimal number FA57C5C0C0DE produces the following keystream (presented as a left to right, top to bottom list of 32 bit hexadecimal numbers):

0x1861600e, 0x88244832, 0x2a6d8201, 0xffd0f37d,
0xb8767ce6, 0xe7bd8954, 0xb3fc97f0, 0xe88caba1

What is claimed is:

1. A method of automatically generating a keystream segment of an arbitrary location of a complete keystream of an additive stream cipher, the method comprising the computer-implemented steps of:

receiving a location value that identifies a location of the keystream segment within the complete keystream;

creating and storing a state value for a leaf node of a balanced binary tree, wherein the leaves of the tree represent the complete keystream and the leaf node represents the keystream segment at the location, by a preorder traversal of the tree from root node to the leaf node wherein a leftward tree branch transition comprises computing a first non-linear function and a rightward tree branch transition comprises computing a second non-linear function;

creating and storing the keystream segment by applying a third function to the state value of the leaf node.

2. The method as recited in claim 1, wherein each leaf node stores m bits of state information, wherein m is a multiple of twelve.

3. The method as recited in claim 1, further comprising the steps of creating and storing a key for use by the first non-linear function and the second non-linear function, wherein the key comprises a table of key dependent pseudorandom values.

4. The method as recited in claim 1, further comprising the steps of creating and storing, once and at a time prior to receiving the location value, a key for use by the first non-linear function and the second non-linear function, wherein the key comprises a table of key dependent pseudorandom values.

5. The method as recited in claim 1, further comprising the steps of creating and storing a key in the form of a plurality of pseudo-randomly selected invertible functions, wherein each of the invertible functions maps an 8-bit portion of the state value to an 8-bit quantity for use as a substitute portion of the state value.

6. A method as recited in claim 1, wherein the pseudo-randomly selected invertible functions are stored in a plurality of substitution tables, and wherein the plurality of substitution tables are generated by:

setting each of the plurality of substitution tables equal to the identity function;

for each element of each of the plurality of substitution tables, swapping said element with another element of such table in a key-dependent manner, and also performing the same swapping operation on each table that has been previously been generated.

7. A method as recited in claim 1, further comprising the steps of creating and storing the balanced binary tree by creating and storing a stack of h elements wherein the $i^{th}$ element of said stack stores a state datum for the $i^{th}$ node on a path from a root node of the tree to the leaf node.

8. A method as recited in claim 7, wherein the step of creating and storing a state value for a leaf node comprises the steps of computing and storing a state value for the leaf node that is unique with respect to any other state value that is computed at any other time for any other leaf node of the tree.

9. The method as recited in claim 1, further comprising the steps of:

creating and storing m=3n bits of state information in each leaf node comprising a concatenation of three n bit quantities z|y|x, wherein n is a multiple of four;

computing the first non-linear function a and the second non-linear function b as the composition of a diffusion function d with the nonlinear "confusion" functions $f$ and g, wherein a $f \circ$d and b=g$\circ$d and wherein $$f(z|y|x)=2z|S(R(S(R(y))))|L(S(L(S(x))))$$

$$g(z|y|x)=2z+1|L(S(L(S(y))))|S(R(S(R(\overline{x}))))$$

$$d(z|y|x)=z|x+y+z|2x+y+z$$

$$c(z|y|x)=x \oplus y$$

wherein integer addition modulo two is denoted as +, bitwise exclusive-or is denoted as $\oplus$, and bitwise complementation is denoted as $\overline{\phantom{x}}$;

wherein the R denotes rotation by n/4 bits to in a direction of a least significant bit and L denotes rotation by n/4 bits in a direction of a most significant bit; and wherein a nonlinear function S comprises a lookup in a key-dependent substitution table.

10. The method as recited in claim 1, wherein the third function comprises computing a linear reduction of 2n bits of the state value to n bits thereof.

11. A method as recited in claim 9, wherein the third function comprises computing a bitwise Boolean exclusive OR of x and y.

12. A method as recited in claim 9, further comprising the steps of creating and storing the substitution table S by selecting four invertible functions and storing the four invertible functions in a concatenated form.

13. A method as recited in claim 9, further comprising the steps of computing functions $f$ and g in seven instructions of a central processing unit that can issue two instructions simultaneously, by using five registers to store values of x, y, z, a temporary variable, and a pointer to the substitution table S.

14. A method as recited in claim 9, wherein the substitution table S comprises an array of key dependent pseudo-random integer values.

15. A method as recited in claim 9, wherein the substitution table S comprises an array of 256 key dependent pseudorandom 32-bit unsigned integer values.

16. A method of enciphering a plaintext using at least one keystream segment at an arbitrary location of a complete keystream, the method comprising the computer-implemented steps of:

receiving a segment of a plaintext;

receiving a location value that identifies a location of the keystream segment within the complete keystream;

creating and storing a state value for a leaf node of a balanced binary tree, wherein the leaves of the tree represent the complete keystream and the leaf node represents the keystream segment at the location, by a preorder traversal of the tree from root node to the leaf node wherein a leftward tree branch transition comprises computing a first non-linear function and a rightward tree branch transition comprises computing a second non-linear function;

creating and storing the keystream segment by applying a third function to the state value of the leaf node;

enciphering the segment of the plaintext by combining the keystream segment with the segment of the plaintext using a Boolean exclusive OR operation to result in creating and storing a segment of ciphertext.

17. A method of encrypting an ordered plurality of packets of a network communication link using at least one keystream segment at an arbitrary location of a complete keystream, the method comprising the computer-implemented steps of:

receiving a packet from among the plurality of packets;

determining a location value that represents a relative location of the packet among the plurality of packets;

creating and storing a state value for a leaf node of a balanced binary tree, wherein the leaves of the tree represent the complete keystream and the leaf node represents a keystream segment at the relative location, by a preorder traversal of the tree from root node to the leaf node wherein a leftward tree branch transition comprises computing a first non-linear function and a rightward tree branch transition comprises computing a second non-linear function;

creating and storing the keystream segment by applying a third function to the state value of the leaf node;

enciphering the packet by combining the keystream segment with data of the packet using a Boolean exclusive OR operation to result in creating and storing enciphered packet data.

18. A computer-readable medium carrying one or more sequences of instructions for automatically generating a keystream segment of an arbitrary location of a complete keystream of an additive stream cipher, which instructions, when executed by one or more processors, cause the one or more processors to carry out the steps of:

receiving a location value that identifies a location of the keystream segment within the complete keystream;

creating and storing a state value for a leaf node of a balanced binary tree, wherein the leaves of the tree represent the complete keystream and the leaf node represents the keystream segment at the location, by a preorder traversal of the tree from root node to the leaf node wherein a leftward tree branch transition comprises computing a first non-linear function and a rightward tree branch transition comprises computing a second non-linear function;

creating and storing the keystream segment by applying a third function to the state value of the leaf node.

19. A computer readable medium as recited in claim 18, wherein the third function comprises computing a linear reduction of 2n bits of the state value to n bits thereof.

20. A computer-readable medium as recited in claim 18, comprising further Sequences of instructions which, when executed by the one or more processors, cause the one or more processors to perform the steps of creating and storms a key for use by the first non-linear function and the second non-linear function, wherein the key comprises a table of key dependent pseudorandom values.

21. A computer-readable medium as recited in claim 18, comprising further sequences of instruction which, when executed by the one or more processors, cause the one or more processors to perform the steps of creating and storing, once and at a time prior to receiving the location value, a key for use by the first non-linear sanction and the second non-linear function, wherein the key comprises a table of key dependent pseudonym values.

22. A computer-readable medium as recited in claim 18, comprising further sequences of instructions which, when executed by the one or more processors, cause the one or more processors to perform the steps of creating and storing a key in the form of a plurality of pseudo-randomly selected invertible functions, wherein each of the invertible functions maps an 8-bit portion of the state value to an 8-bit quantity for use as a substitute portion of the state value.

23. A computer readable medium as recited in claim 18 wherein the pseudo-randomly selected invertible functions are stored in a plurality of substitution tables, and wherein the plurality of substitution tables are generated by;

setting each of the plurality of substitution tables equal to the identity function;

for each element of each of the plurality of substitution tables, swapping said element with another element of such table in a key-dependent manner, and also performing the same swapping operation on each table that has been previously been generated.

24. A computer readable medium as recited in claim 18, wherein each leaf node stores m bits of state information, wherein m is a multiple of twelve.

25. A computer-readable medium as recited in claim 18, comprising further sequences of instructions which, when executed by the one or more processors, cause the one or more processors to perform the steps of creating and storing the balanced binary tree by creating and storing a stack of h elements wherein the $i^{th}$ element of said stack stores a state datum for the $i^{th}$ node on a path from a root node of the tree to the leaf node.

26. A computer readable medium as recited in claim 25, comprising further sequences of instructions which, when executed by the one or more processors, cause the one or more processors to perform the steps of creating and storing a state value far a leaf node comprises the steps of computing and storing a state value for the leaf node that is unique with respect to any other state value that is computed at any other time for any other leaf node of the tree.

27. A computer-readable medium as recited in claim 18, comprising further sequences of instructions which, when executed by the one or wore processors, cause the one or more processors to perform the steps of:

creating and storing m=3n bits of state information in each leaf node comprising a concatenation of three n bit quantities z|y|x, wherein n is a multiple of four computing the first non-linear function a and the second non-linear function b as the composition of a diffusion function d with the nonlinear "confusion" functions $f$ and $g$, wherein $a = f \circ d$ and $b = g \circ d$ and wherein $$f(z|y|x)=2z|S(R(S(R(y))))|L(S(L(S(x))))$$
$$g(z|y|x)=2z+1|L(S(L(S(y))))|S(R(S(R(\overline{x}))))$$
$$c(z|y|x)=x \oplus y$$

wherein integer addition modulo two is denoted as +, bitwise exclusive-or is denoted $\oplus$, and bitwise complementation is denoted as $\overline{\phantom{x}}$;

wherein the R denotes rotation by n/4 bits to in a direction of a least significant bit and L denotes rotation by n/4 bits in a direction of a most significant bit; and wherein a nonlinear function S comprises a lookup in a key-dependent substitution table.

28. A computer-readable medium as recited in claim 27, wherein the third function comprises computing a bitwise Boolean exclusive OR of x and y.

29. A computer-readable medium as recited in claim 27, comprising further sequences of instructions which, when executed by the one or more processors, cause the one or more processors to perform the steps of creating and storing the substitution table S by selecting four invertible functions and storing the four invertible functions in a concentrated form.

30. A computer-readable medium as recited in claim 27, comprising further sequences of instructions which, when executed by the one or more processors, cause the one or mote processors to perform the steps of computing functions $f$ and $g$ in seven instructions of a central processing unit that can issue two instructions simultaneously, by using five registers to store values of x, y, z, a temporary variable, and a pointer to the substitution table S.

31. A computer readable medium as recited in claim 27, wherein the substitution table S comprises an array of key dependent pseudorandom integer values.

32. A computer-readable medium as recited in claim 27, wherein the substitution table S comprises an array of 256 key dependant pseudorandom 32-bit unsigned integer values.

33. An apparatus for automatically generating a keystream segment of an arbitrary location of a complete keystream of an additive stream cipher, comprising:

means for receiving a location value that identifies a location of the keystream segment within the complete keystream;

means for creating and storing a state value for a leaf node of a balanced binary tree, wherein the leaves of the tree represent the complete keystream and the leaf node represents the keystream segment at the location, by a preorder traversal of the tree from root node to the leaf node wherein a leftward tree branch transition comprises computing a first non-linear function and a rightward tree branch transition comprises computing a second non-linear function;

means for creating and storing the keystream segment by applying a third function to the state value of the leaf node.

34. An apparatus as recited in claim 33, further comprising means for creating and storing a key for use by the first non-linear function and the second non-linear function, wherein the key comprises a table of key dependant pseudorandom values.

35. An apparatus as recited in claim 33, further comprising means for creating and storing, once and at a time prior to receiving the location value, a key for use by the first non-linear function and the second non-linear function, wherein the key comprises a table of key dependent pseudorandom values.

36. An apparatus as recited in claim 33, further comprising means for creating and storing a key in the form of a plurality of pseudo-randomly selected invertible functions, wherein each of the invertible functions mans an 8-bit portion of the state value to an 8-bit quantity for use as a substitute portion of the state value.

37. An apparatus as recited in claim 33 wherein the pseudo-randomly selected invertible functions are stored in a plurality of substitution tables, and wherein the plurality of substitution tables are generated by means for;

setting each of the plurality of substitution tables equal to the identity function:

for each element of each of the plurality of substitution tables swapping said element with another element of such table in a key-dependant manner, and also performing the same swapping operation on each table that has been previously been generated.

38. An apparatus as recited in claim 33, wherein the third function comprises computing a linear reduction of 2n bits of the state value n bits thereof.

39. An apparatus as recited in claim 33, wherein each leaf node stores m bits of state information, wherein m is a multiple of twelve.

40. An apparatus as recited in claim 33, further comprising creating and storing the balanced binary tree by creating and storing a stack of h elements wherein the $i^{th}$ element of said stack stores a state datum for the $i^{th}$ node on a path from a root node of the tree to the leaf node.

41. An apparatus as recited in claim 40, further comprising creating and storing a state value for a leaf node comprises the steps of computing and storing a state value for the leaf node that is unique with respect to any other state value that is commuted as any other time for any other leaf node of the tree.

42. An apparatus as recited in claim 33 further comprising:

means for creating and storing m-3n bits of state information in each leaf node comprising a concatenation of three n bit quantities z|y|x, wherein n is a multiple of four;

means for computing the first non-linear function a and the second non-linear function b as the composition of a diffusion function d with the nonlinear "confusion" functions $f$ and $g$, wherein $a = f \circ d$ and $b = g \circ d$ and wherein $f(z|y|x) = 2z | S(R(S(R(y)))) | L(S(L(S(x))))$ $g(z|y|x) = 2z + | L(S(L(S(y)))) | S(R(S(R(\overline{x}))))$ $d(z|y|x) = z | x+y+z | 2x+y+z$ $c(z|y|x) = x \oplus y$ wherein integer addition module two is denoted as +, bitwise exclusive or is denoted as $\oplus$, and bitwise complementation is denoted as $\overline{\phantom{x}}$;

wherein the R denotes rotation by n/4 bits to in a direction of a least significant bit and L denotes rotation by n/4 bits in a direction of a most significant bit; and wherein a nonlinear function S comprises a lookup in a key-dependent substitution table.

43. An apparatus as recited in claim 42, wherein the third function comprises computing a bitwise Boolean exclusive OR of x and y.

44. An apparatus as recited in claim 42, further comprising means for creating and storing the substitution table S by selectins four invertible functions and storing the four invertible functions in a concatenated form.

45. An apparatus as recited in claim 42, further compromises means for computing functions $f$ and $g$ in seven instructions of a central processing unit that can issue two instructions simultaneously, by using five registers to store values of x, y, z, a temporary variable, and a red pointer to the substitution table S.

46. An apparatus as recited in claim 42, wherein the substitution table S comprises an array of key dependent pseudorandom integer values.

47. An apparatus as recited in claim 42 wherein the substitution table S comprises an array of 256 key dependent pseudorandom 32-bit unsigned integer values.

48. An apparatus for automatically generating a keystream segment of an arbitrary location of a complete keystream of an additive stream cipher, comprising:

a network interface that is coupled to the data network for receiving one or more packet flows therefrom;

a processor;

one or more stored sequences of instructions which, when executed by the processor, cause the processor to carry out the steps of:

receiving a location value that identifies a location of the keystream segment within the complete keystream;

creating and storing a state value for a leaf node of a balanced binary tree, wherein the leaves of the tree represent the complete keystream and the leaf node represents the keystream segment at the location, by a preorder traversal of the tree from root node to the leaf node wherein a leftward tree branch transition comprises computing a first non-linear function and a rightward tree branch transition comprises computing a second non-linear function;

creating and storing the keystream segment by applying a third function to the state value of the leaf node.

49. An apparatus as recited in claim 48, wherein each leaf node stores m bits of state information, wherein m is a multiple of twelve.

50. An apparatus as recited in claim 48, wherein the third function comprises computing a linear reduction of 2n bits of the state value to n bits thereof.

51. An apparatus as recited in claim 48, wherein the sequences of instructions comprise further sequences of instructions which when executed by the processor, cause the processor to perform the steps of creating and storing a key for use by the first non-linear function and the second non-linear function wherein the key comprises a table of key dependent pseudorandom values.

52. An apparatus as recited in claim 48, wherein the sequences of instructions comprise further sequences of instructions which, when executed by the processor, cause the processor to perform the steps of creating and storing, once and at a time prior to receiving the location value, a key for use by the first non-linear function and the second non-linear function, wherein the key comprises a table of key dependent pseudorandom values.

53. An apparatus as recited in claim 48, wherein the sequences of instructions comprise further sequences of instructions which, when executed by the processor, cause the processor to perform the steps of creating and storing a key in the form of a plurality of pseudo-randomly selected invertible functions, wherein each of the invertible functions maps an 8-bit portion of the state value to an 8-bit quantity for use as a substitute portion of the state value.

54. An apparatus as recited in claim 48, wherein the pseudo-randomly selected invertible functions are stored in a plurality of substitution tables, and wherein the plurality of substitution tables are generated by instructions for performing the steps of:

setting each of the plurality of substitution tables equal to the identity function;

for each element of each of the plurality of substitution tables, swapping said element with another element of such table in a key-dependant manner, and also performing the same swapping operation on each table that has been previously been generated.

55. An apparatus as recited in claim 48, wherein the sequences of instructions comprise further sequences of instructions which, when executed by the processor, cause the processor to perform the steps of creating and storing the balanced binary tree by creating and storing a stack of h elements wherein the $i^{th}$ element of said stack stores a state datum for the $i^{th}$ node on a path from a root node of the tree to the leaf node.

56. An apparatus as recited in claim 55, wherein the sequences of instructions comprise further sequences of instructions which, when executed by the processor, cause the processor to perform the steps of creating and storms a state value for a leaf node comprises the steps of computing and storms a state value for the leaf node that is unique with respect to any other state value that is computed at any other time for any other leaf node of the tree.

57. An apparatus as recited in claim 48, wherein the sequences of instructions comprise further sequences of instructions which, when executed by the processor, cause the processor to perform the steps;

creating and storing m=3n bits of state information in each leaf node comprising a concatenation of three n bit quantities z|y|x, wherein n is a multiple of four:

computing the first non-linear function a and the second non-linear function b as the composition of a diffusion function d with the nonlinear "confusion" functions t and g, wherein a=f∘d and b=g∘d and wherein $f(z|y|x)=2z|S(R(S(R(y))))|L(S(L(S(x))))$ $g(z|y|x)=2z+1|L(S(L(S(y))))|S(R(S(R(\overline{x}))))$ $d(z|y|x)=z|x+y+z|2x+y+z$ $c(z|y|x)=x \oplus y$ wherein integer addition modulo two is denoted as +, bitwise exclusive-or is denoted as ⊕, and bitwise complementation is denoted as ⌐;

wherein the R denotes rotation by n/4 bits to in a direction of a least significant bit and L denotes rotation by n/4 bits in a direction of a most significant bit; and wherein a nonlinear function S comprises a lookup in a key-dependent substitution table.

58. An apparatus as recited in claim 57, wherein the third function comprises computing a bitwise Boolean exclusive OR of x and y.

59. An apparatus as recited in claim 57, wherein the sequences of instructions comprise further sequences of instructions which, when executed by the processor, cause the processor to perform the steps of creating and storing the substitution table S by selecting four invertible functions and storing the four invertible functions in a concatenated form.

60. An apparatus as recited in claim 57, wherein the sequences of instructions comprise further sequences of instructions which, when executed by the processor, cause the processor to perform the steps of computing functions f and g in seven instructions of a central processing unit that can issue two instructions simultaneously, by using five resisters to store values of x, y, z, a temporary variable, and a pointer to the substitution table S.

61. An apparatus as recited in claim 57, wherein the substitution table S comprises an array of key dependent pseudorandom integer values.

62. An apparatus as recited in claim 57, wherein the substitution table S comprises an array of 256 key dependent pseudorandom 32-bit unsigned integer values.

* * * * *

UNITED STATES PATENT AND TRADEMARK OFFICE
CERTIFICATE OF CORRECTION

PATENT NO. : 6,862,354 B1
DATED : March 1, 2005
INVENTOR(S) : David A. McGrew et al.

It is certified that error appears in the above-identified patent and that said Letters Patent is hereby corrected as shown below:

Column 15,
Line 62, "storms" should read -- storing --.

Column 16,
Line 4, "sanction" should read -- function --.
Line 6, "pseudonym" should read -- pseudorandom --.
Line 41, "far" should be -- for --.

Column 17,
Line 11, "concentrated" should read -- concatenated --.
Line 16, "mote" should read -- more --.
Line 59, "mans" should read -- maps --.

Column 18,
Line 54, "selectins" should read -- selecting --.
Lines 56-57, "compromises" should read -- comprising --.

Column 20,
Lines 10 and 12, "storms" should read -- storing --.
Line 24, "the nonlinear "confusion" functions t" should read -- the nonlinear "confusion" functions f --.

Signed and Sealed this

Twenty-first Day of June, 2005

JON W. DUDAS
*Director of the United States Patent and Trademark Office*